Sept. 13, 1949.  E. F. NORELIUS  2,481,529
TORQUE CONVERTER DRIVE

Filed Sept. 21, 1945  2 Sheets-Sheet 1

INVENTOR.
EMIL F. NORELIUS
BY
J. H. Church & H. E. Thibodeau
ATTORNEYS

Sept. 13, 1949. E. F. NORELIUS 2,481,529
TORQUE CONVERTER DRIVE
Filed Sept. 21, 1945 2 Sheets-Sheet 2

INVENTOR.
EMIL F. NORELIUS
BY
J. H. Church + H. E. Thibodeau
ATTORNEYS

Patented Sept. 13, 1949

2,481,529

UNITED STATES PATENT OFFICE 2,481,529

TORQUE CONVERTER DRIVE

Emil F. Norelius, Springfield, Ill.

Application September 21, 1945, Serial No. 617,884

5 Claims. (Cl. 74—677)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to power transmission devices, and more particularly to a power transmission device comprising a mechanical gear train and a hydraulic gear for automotive installations.

In military tanks, and in tractors, trucks and automobiles, a high starting torque is required to accelerate the vehicle from a standing start. As the speed increases, the torque required to sustain the motion decreases continuously. Therefore, in military vehicles, especially where high maneuverability and mobility are necessary, it is essential that a continuously variable type of transmission be employed so that the engine may continuously supply power to the vehicle drive. Because of these requirements, the well known 'Fottinger type of fluid torque converter having a stationary guide wheel (reference Patent No. 1,199,364) has been used with success in some automotive installations. However, considerable difficulty has been experienced with such installations, because of high fuel consumption and difficulty in cooling both the engine and the torque converter, particularly, in portions of the speed range where the efficiency is low.

Coats in Patent No. 1,760,480 made considerable improvement by mounting the guide wheel of the torque converter on a one-way brake so that the guide wheel is fixed in one direction of rotation and rotatable in the other direction. In this unit, the torque varies automatically, with high efficiency throughout most of the speed range. But it has been rather difficult to achieve high torque capacity in the high speed "direct drive" range and still maintain the high efficiency.

Previous attempts to overcome the basic difficulties of producing a transmission with the required flexibility and high efficiency, particularly at high speed, have usually included mechanisms such as valves, governors, brakes and clutches, which are expensive and which require delicate adjustment and very considerable servicing and maintenance.

One object of my invention is to devise a transmission unit, particularly suitable, because of its utmost simplicity for application to military tanks, tractors, trucks and automobiles, which has high torque at the output shaft for load starting ability and which has inherently-automatic and continuously variable change to a higher efficiency unit when the input and output shafts are operating at or near the same speed.

Another object of my invention is to accomplish the above without the use of brakes, clutches or similar rubbing friction devices and without the use of governors or other elaborate or complicated valving or synchronizing devices common to automatic transmission designs.

A further object of my invention is to provide a design which will allow the use of a relatively smaller, higher efficiency hydraulic circuit, by operating the impeller at a speed higher than that of the input shaft.

A still further object of my invention is to provide a continuously variable transmission unit of utmost simplicity which will always operate through the fluid drive, thus having the advantages of smooth, shockless, vibrationless, continuously-variable power transmission and acceleration under driving power, and which will be highly suitable for the combination with and utilization of the normal flexible characteristics of present internal combustion engines, thus giving great maneuverability and mobility and high fuel economy to any vehicle in which the combination is installed.

An additional object of my invention is to provide a means of increasing both the effective high speed torque capacity and the overall efficiency of a fluid transmission by providing a means for driving both the impeller and the reaction member of the fluid transmission, when the speed of the output shaft approaches that of the input shaft, the condition for direct drive.

A still additional object of my invention is to provide a continuously variable transmission which will substantially rotate as a unit at high efficiency when the relative torque and speed conditions within the unit approach those of "direct drive."

For a better understanding of my invention, together with other and further objects thereof, reference is had to the following description, taken in connection with the accompanying drawings, and its scope will be pointed out in the appended claims:

Figure 1:
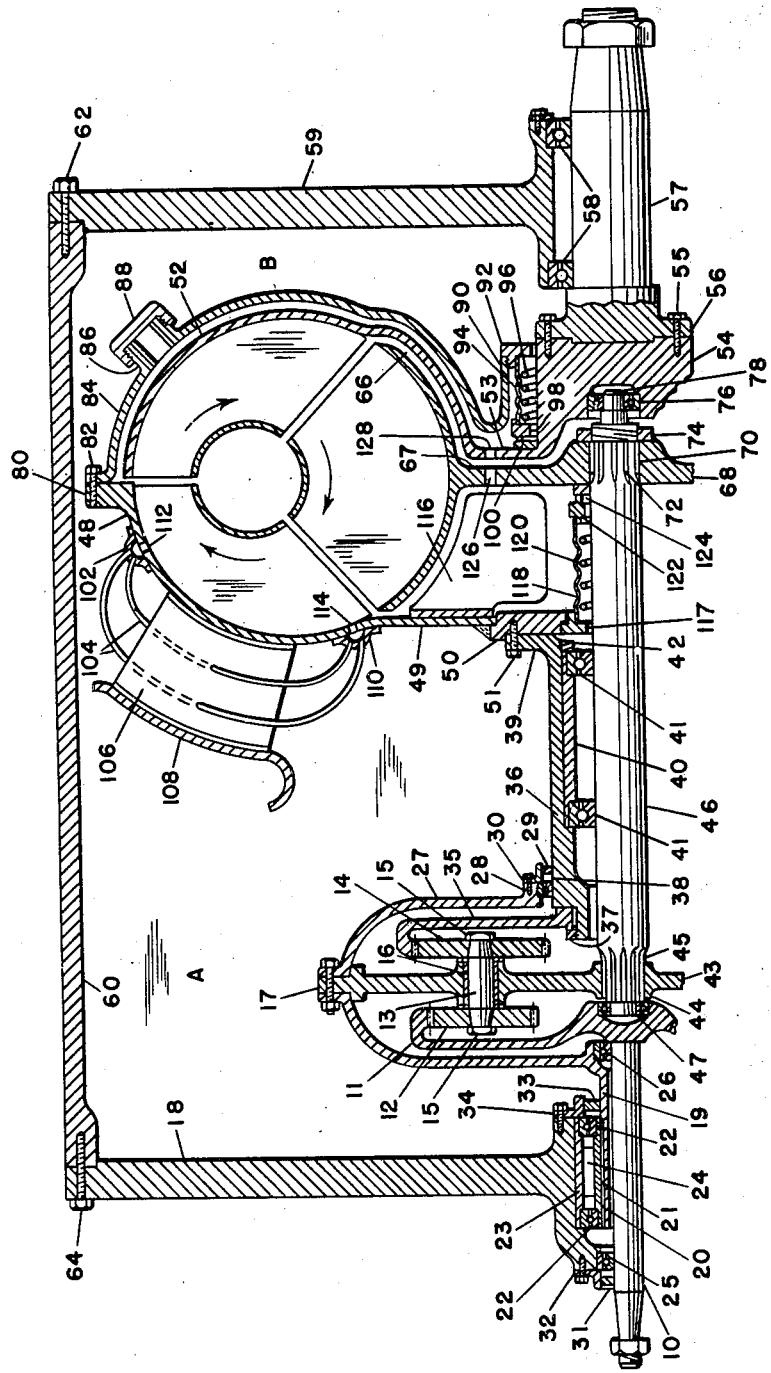
Fig. 1 illustrates a vertical cross-section, partly diagrammatic, of a power transmission built in accordance with my invention. In this drawing, I have illustrated a gear train A and an hydraulic device B.

In Fig. 1, the gear train A comprises a ring gear 11 mounted on input shaft 10 which is rotatable in bearings 25 and 26 and in oil seal 31 mounted in retainer 32. Engaging the ring gear 11 are a plurality of planet gears 12 which are fixedly mounted on a plurality of shafts 13, on which are also fixedly mounted, a plurality of planet gears 14 having a preferably larger diameter than planet gears 12. Gears 12 and 14 are retained on shaft 13 by means of nuts 15. Shafts 13 are rotatably mounted in the planet bearings 16 of planet carrier 17. The planet carrier 17 is mounted in the transmission case member 18 by means of the splined reaction shaft 19 which is mounted in splines 20 of a conventional cam and roller type of one-way brake composed of cammed inner race 21, bearings 22, outer race 23 and rollers 24. Oil seal 33 is mounted in retainer 34 which also serves to hold tight the components of the one-way brake in the transmission case member 18. Attached to the outside of the planet carrier 17 is an enclosing member 27, which rotates with the planet carrier 17, and which is provided with a bearing 28, an oil seal 29 and retainer 30. Planet gears 14 engage the ring gear 35, which is splined onto one end of the hollow intermediate drive shaft 36 and retained by nut 37. The hollow intermediate drive shaft 36 comprises an exterior portion 38 adapted to form a bearing surface for bearing 28 and a sealing surface for oil seal 29 and a flanged end 39. A sleeve 40 for spacing the bearings 41 and a nut 42 are provided in the hollow interior of the shaft 36. The planet carrier 17, previously referred to, has a central hub 43 which has internal splines 44 adapted to be mated on similar splines 45 of the intermediate reaction shaft 46. The intermediate reaction shaft 46 is rotatably mounted in the bearings 41 of the intermediate drive shaft 36 and also in the pilot bearing 47 mounted inside ring gear 11 for the purpose of ensuring concentric alignment.

The intermediate drive shaft 36 and the intermediate reaction shaft 46 serve to operably connect the gear train A, described above, to the hydraulic device B.

Hydraulic device B, shown in the accompanying drawing, is essentially the hydrodynamic transmission shown in the pending patent application, Serial No. 509,682 of John F. Swift, filed November 10, 1943. However, it is to be understood that other similar or well known hydrodynamic transmissions can be substituted therefor.

The hydraulic device B comprises a casing in which pump, turbine and reaction wheels provided with vanes circulate fluid in the direction indicated by the arrows and thereby transmit power from one wheel to another. It includes in its construction, elements which provide for proper cooling of the fluid, expansion of the fluid, and generation of sufficient fluid pressure to prevent cavitation.

In hydraulic device B, the pump wheel 48 is provided on its driving disc 49 with a flange 50, which is fastened to flange 39 of the hollow intermediate drive shaft 36 by means of bolts 51. The turbine wheel 52 is provided with a central web 53 and a central hub 54 to which is fastened by means of bolts 55 the flange 56 of output shaft 57. The output shaft 57 is rotatable in bearings 58 mounted in transmission case member 59 which is rigidly connected to transmission case 60 by means of bolts 62. Transmission case 60 is also connected to transmission case member 18 by bolts 64; thereby transmission case members 18 and 59 form, with case 60, a rigid foundation for my complete transmission unit.

The reaction wheel 66 is provided with a central web 67 and a central hub 68 which has internal splines 70 adapted to be mated on similar splines 72 of the intermediate reaction shaft 46. Nut 74 retains hub 68 of reaction wheel 66 on the intermediate reaction shaft 46. A pilot bearing 76 mounted in hub 54 of turbine wheel 52 serves to guide the end portion 78 of the intermediate reaction shaft 46, providing concentric alignment therefor.

Pump wheel 48 is provided with an exterior flange 80 for attachment by means of bolts 82 of rotatable housing member 84. Housing member 84 is provided with a threaded filler pipe 86 adapted to receive the threaded filler cap 88, and also with a threaded hub 90. A bellows seal, comprised of threaded ring 92, bellows 94, spring 96 and seal nosepiece 98, and with ring 92 threaded into hub 90, seals against a seal ring 100 which is mounted on hub 54 of turbine wheel 52. This seal prevents leakage of fluid from the hydraulic circuit between the housing hub 90 and the turbine hub 54.

Pump wheel 48 is provided with an exterior rotating radiator unit composed of outlet manifold 102, a plurality of cooling tubes 104, fan blades 106, fan shroud 108 and inlet manifold 110, whereby fluid from the hydraulic circuit is circulated through a plurality of holes 112 to the exterior rotating radiator unit and is returned to the hydraulic circuit through a plurality of holes 114, because of dynamic pressure differentials in the hydraulic device B. The complete theory and construction of this type of exterior rotating radiator is described in complete detail in said pending patent application, Serial No. 509,682 of John F. Swift.

Pump wheel 48 is also provided with a set of pump vanes 116 which are firmly attached to pump wheel driving disc 49 by welding or other suitable means. A bellows seal, comprised of threaded ring 117, bellows 118, spring 120 and seal nosepiece 122, and with ring 117 threaded into flange 50, seals against a seal ring 124 which is mounted on intermediate reaction shaft 46. This prevents any leakage of fluid from the hydraulic circuit between the pump wheel flange 50 and the intermediate reaction shaft 46.

Pump vanes 116 rotate with the pump wheel 48 and create a centrifugal pressure which acts outwardly on the main hydraulic circuit to reduce or prevent cavitation. To equalize this pressure throughout the hydraulic circuit, a plurality of holes 126 and 128 are provided in central web 67 of reaction wheel 66, and in central web 53 of turbine wheel 52, respectively.

Figure 2:
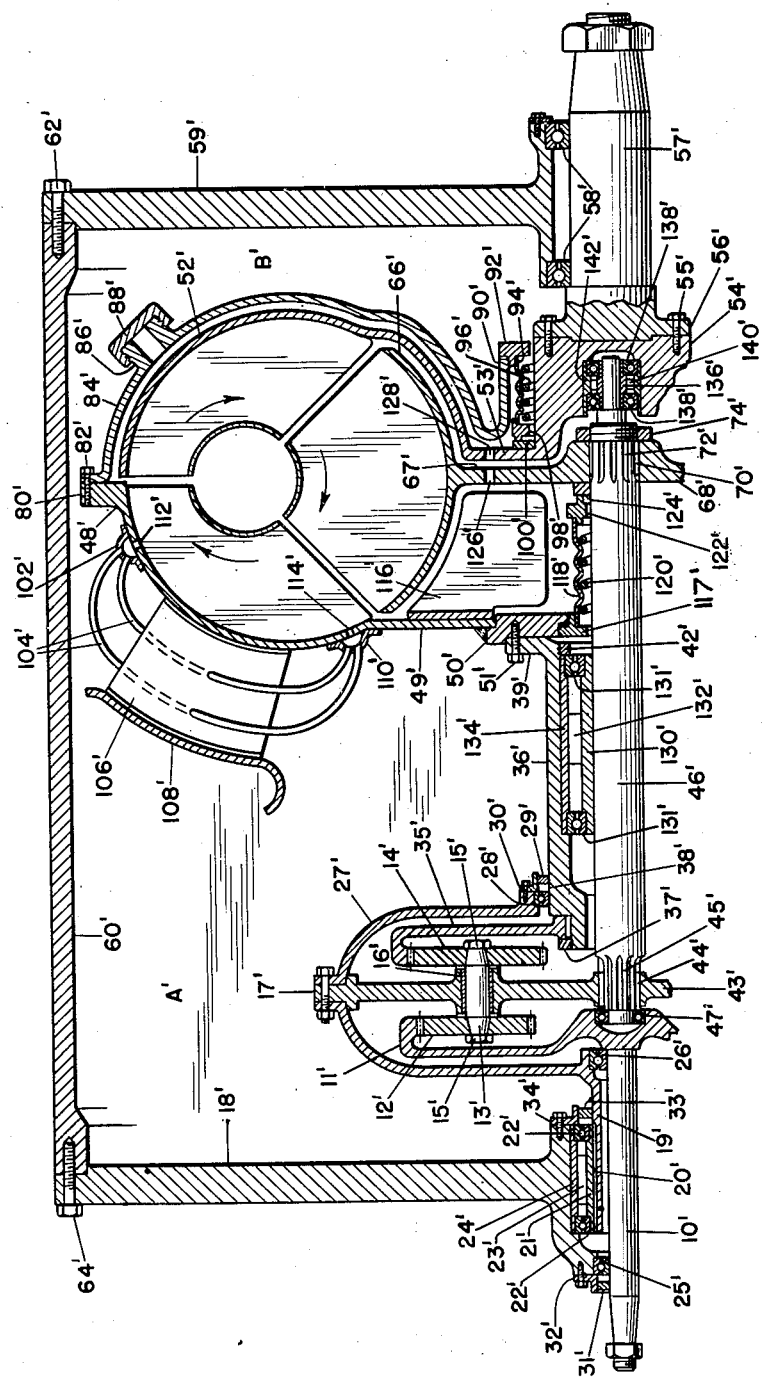
Fig. 2 is a similar illustration in which I have incorporated as modifications, two, optional, one-way clutches.

In Fig. 2, the gear train A and the hydraulic device B are essentially the same as in Fig. 1, and therefore, I have used the same numbers with prime marks for enumerating these parts in Fig. 2. The difference lies in the addition of two one-way clutches, in the power transmission of Fig. 2, to the power transmission shown in Fig. 1.

In Fig. 2, I have introduced between the intermediate reaction shaft 46' and the intermediate drive shaft 36', a conventional one-way clutch, composed of a cammed inner race 130', bearings 131', rollers 132' and outer race 134'. This one-way clutch serves to lock the intermediate reaction shaft 46' to the intermediate drive shaft 36', whenever the former tends to overrun the latter.

In Figure 2, I have also introduced between the intermediate reaction shaft 46' and the central hub 54' of turbine wheel 52', a conventional one-way clutch composed of cammed inner race 136', bearings 138', rollers 140' and outer race 142', This one-way clutch serves to lock the intermediate reaction shaft 46' to the central hub 54' of turbine wheel 52' whenever the former tends to overrun the latter.

My power transmission device of Fig. 1 operates in the following manner:

a. With the output shaft 57 stationary, as when a vehicle is at rest, power is supplied to the transmission through drive shaft 10 and ring gear 11 to planet gears 12 and 14, and thence to ring gear 35. The reaction torque of planet gears 12 and 14 is taken by the planet carrier 17, restrained from rotation by one-way brake means 21, 23 and 24 and an opposite reaction torque of reaction wheel 66 as now described. The reaction torque of planet gears 12 and 14 has the same rotational sense as the torque of the ring gear 11. Ring gear 35 rotatoes in the same direction as the drive shaft 10 and supplies power to the pump wheel 48. Pump wheel 48 circulates fluid through the toroidal fluid circuit (completed by turbine wheel 52 and reaction wheel 66), causing torques on the turbine wheel 52 and reaction wheel 66, which may be expressed mathematically as follows:

$$T_T = T_P + T_R$$

where $T_T$ = torque on turbine wheel 52
$T_P$ = torque on pump wheel 48
$T_R$ = torque on reaction wheel 66

The torque ratio $\rho$ is $$\rho = \frac{T_T}{T_P}$$

The value of each of these factors will vary with the detailed design of the hydraulic device B, but in general, with a stationary output shaft 57, $T_R$ will be considerably greater than $T_P$ and $T_T$ will also be greater than $T_P$. $T_T$ and $T_P$ will have the same sense of rotation, but $T_R$ will have the opposite sense.

The reaction $T_R$ of reaction wheel 66 is transmitted to the intermediate reaction shaft 46, and thence back to the planet carrier 17.

Hence planet carrier 17 is acted on by two torques, namely, the reaction torque of the reaction wheel 66 and the reaction torque of the planet gears 12 and 14. These two torques have the opposite sense. The vector sum of these two torques is transmitted by the planet carrier 17 to the final reaction shaft 19, and thence finally to the transmission case member 18 through the one-way brake composed of inner race 21, bearings 22, rollers 24 and outer race 23. The overall torque relations within my transmission device may be expressed as follows:

$$T_T = T_i + T_c$$

where $T_T$ = torque on turbine wheel 52
$T_i$ = torque on input shaft 10
$T_c$ = reaction torque on transmission case member 18

Hence the overall torque ratio R is:

$$R = \frac{T_T}{T_i} = \frac{T_i + T_c}{T_i}$$

If $r$ = the ratio of the number of teeth in the gears 12, 11, 35, and 14, the total ratio through the epicyclic train:

$$T_P = rT_i$$

Therefore $$R = \frac{rT_T}{T_P}$$

But $$T_T/T_P = \rho$$

Hence $$R = r\rho$$

The torque reaction $T_G$ of the planet gears 12 and 14 on the planet carriers 17 may be expressed:

$$T_G = T_i - T_P$$

and also as:

$$R = r\rho$$

The torque reaction, $T_G$, of the planet gears 12 and 14 on the planet carrier 17, may be expressed in terms of the torque carried by the various gears through their respective radii.

For the ring gear construction shown:

$$T_G = \left[\frac{t_{11}}{r_{11}} - \frac{t_{11}r_{12}}{r_{11}r_{14}}\right](r_{11} - r_{12}) = t_{11}\left[\frac{1}{r_{11}} - \frac{r_{12}}{r_{11}r_{14}}\right](r_{11} - r_{12})$$

Where $t_{11}$ = torque on ring gear 11
$r_{11}$ = radius of ring gear 11
$r_{12}$ = radius of planet gear 12
$r_{14}$ = radius of planet gear 14

For a sun gear construction, which I have not illustrated, but which is well-known in the art, $$T_G = \left[\frac{t_{11}}{r_{11}} - \frac{t_{11}r_{12}}{r_{11}r_{14}}\right](r_{11} + r_{12}) = t_{11}\left[\frac{1}{r_{11}} - \frac{r_{12}}{r_{11}r_{14}}\right](r_{11} + r_{12})$$

Thus it can be seen that a wide selection of the magnitude of the torque reaction $T_G$ is possible by careful selection of the gear ratios and planetary construction.

The construction of various planetary systems is well-known and consequently I have not attempted to show all the variations possible.

In practice I prefer to select a construction of the planetary system which will yield a planetary ratio, $r$, of less than 1, so that there will be a speed-up of the hydraulic device B. Also I prefer that the reaction torque of the planetary carrier 17 be small. In this way I get a more efficient and smaller size hydraulic device B due to the faster rotation and I do not appreciably reduce the maximum torque ratio which hydraulic device B produces at output shaft 57. Also, the reaction torque of the planet carrier with this choice of planetary system will oppose the reaction torque of the reaction wheel 66 and hence diminish the total reaction torque which is taken by the one-way brake mounted in transmission case 18.

b. As the output shaft 57 starts to rotate, the output torque produced by hydraulic device B will continuously decrease, assuming a constant input torque and speed supplied by input shaft 10. Likewise the reaction torque of reaction wheel 66 will continuously decrease due to the changed conditions within the fluid circuit of the hydraulic device B. This characteristic is well known in the torque converter art.

c. As the output shaft 57 continues to speed up relative to the input shaft 10, the torque of both the turbine wheel 52 and the reaction wheel 66 will continue to decrease until finally a condition will be attained at which the reaction torque of the reaction wheel 66 will just equal the counter reaction torque produced by the planet carrier 17. At this point there will be no net reaction torque on the one-way brake of the transmission case 18.

d. As the output shaft 57 continues to speed up relative to the input shaft 10 there will be further tendency for the reaction torque of the reaction wheel 66 to decrease. However, any decrease in the reaction torque of reaction wheel 66 will result in the counter reaction torque of the planet carrier 17 causing rotary motion of the planet carrier 17 and forcing the reaction wheel 66 to rotate in the same direction as the pump wheel and turbine wheel of hydraulic device B. Hence, in effect, the engine will supply power via the epicyclic gear A to both pump wheel 48 and reaction wheel 66. There will be no net reaction torque on the transmission case member 18 and the one-way brake will be released. In effect both the epicyclic gear train A and the hydraulic device B will be rotating freely. The speed of the output shaft 57 will approach that of the input shaft 10 and thus approximate a "direct drive" condition. There will be a slight lag of the output shaft 57 behind that of the input shaft 10, because of the necessity of circulating fluid in the torque converter, with its attendant reduction in efficiency. However, because both the pump wheel 48 and the reaction wheel 66 are supplying power to the fluid the torque capacity of the hydraulic device B will be high and the efficiency will stay up near the peak of its efficiency curve.

e. Further increase in speed of the output shaft 57 can be attained by a reduction in torque load thus resulting in improved efficiency of the hydraulic device B; or further increase in speed of the output shaft 57 may be attained through an increase in the speed of the input shaft 10. An increase in speed of the input shaft 10 will result both in faster speed of the output shaft 57 and in an increase in efficiency of the hydraulic device B, whose mode of operation can be conceived as thus approaching that of the well known fluid coupling.

f. As torque requirements increase the speed of the output shaft 57 will be reduced, and the operating conditions within my transmission device will change in the reverse order. The reaction torque of the reaction wheel 66 will increase until it approaches that of the counter reaction torque of the planet carrier 17. Thus the planet carrier will slow down; and, at such a condition that the two reaction torques are just equal, further rotary motion of the reaction wheel 66 and planet carrier 17 will cease. Further increase in the reaction torque of the reaction wheel 66 will cause its magnitude to exceed that of the counter reaction torque of the planet carrier 17, the excess reaction torque will cause the one-way brake in the transmission case member 18 to function and lock the planet carrier 17 in a stationary position.

g. As the torque requirements increase still further, the speed of the output shaft 57 will be reduced until finally a condition will be reached when the output shaft 57 will be brought to a complete stall. This completes the cycle of operation of my power transmission device of Fig. 1.

The operation of my modified transmission device shown in Fig. 2 is very similar to that shown in Fig. 1. The device will act exactly as described above up to the condition where the reaction wheel 66' and the planet carrier start to rotate. If the torque requirements of this unit fall off, there will also result an increase in speed of the reaction wheel 66'. As this speed approaches and tends to exceed that of the output shaft 57', the one-way clutch interposed between the intermediate reaction shaft 46' and the central hub 54' of turbine wheel 52' will lock up and prevent the reaction wheel 66' from overrunning the turbine wheel 52'. As the speed of the reaction wheel 66' increases still further and hence approaches and tends to exceed that of the intermediate drive shaft 36', the one way clutch interposed between the intermediate reaction shaft 46' and the intermediate drive shaft 36' will lock up and prevent the reaction wheel 66' from overrunning the pump wheel 48'. Under these conditions of operation, which occur when the output shaft is being driven by an exterior load, as when coasting down a hill, my transmission device rotates as a reverse "direct-drive," enabling the engine of the vehicle to act as a brake and slow down the vehicle, thus keeping the vehicle under control at all times.

As the output shaft 57' slows down and power is again supplied by the engine, the one-way clutches will progressively free themselves in the reverse order and the transmission unit of Fig. 2 will again function exactly as described above for Fig. 1.

It is obvious, however, that either of the additional one way clutches of Fig. 2 could be omitted if desired without departing from the spirit and intent of my invention.

Thus, it can be seen that I have devised a simple, flexible transmission unit which is especially suitable for installation in a military tank, tractor, truck or automobile.

What I claim as new and desire to secure by Letters Patent of the United States is:

1. In a power transmission device, the combination of a transmission case, an epicyclic gear train comprising a driving gear, a driven gear, planet gears engaging said driving and driven gears, a planet carrier, a one-way brake for releasably connecting said planet carrier to said transmission case, a hydraulic device including a pump wheel, a turbine wheel and a reaction wheel, said pump wheel and reaction wheel being connected respectively to the driven gear and the planet carrier of said epicyclic gear train.

2. In a power transmission device, the combination of a driving shaft, a driven shaft, a transmission case, an epicyclic gear train including a driving gear attached to said driving shaft, a driven gear of larger diameter than said driving gear, a planet carrier, a plurality of planet gears engaging said driving and driven gears, said planet gears being rotatable with respect to said planet carrier, a one-way brake for releasably connecting said planet carrier to said transmission case, a hydraulic device comprising a pump wheel, a turbine wheel and a reaction wheel, said pump wheel and reaction wheel being connected respectively to the driven gear and the planet carrier of said epicyclic gear train and said turbine wheel being connected to the driven shaft.

3. In a power transmission device, the combination of a transmission case, an epicyclic gear train comprising a driving gear, a driven gear, planet gears engaging said driving and driven gears, a planet carrier, a one-way brake for releasably connecting said planet carrier to said transmission case, a hydraulic device including a pump wheel, a turbine wheel and a reaction wheel, said pump wheel and reaction wheel being connected respectively to the driven gear and the planet carrier of said epicyclic gear train, and an automatic one-way clutch for locking the reaction wheel to the pump wheel when the latter tends to overrun the former.

4. In a power transmission device, the combination of a transmission case, a driving shaft, a driven shaft, an intermediate drive shaft, an intermediate reaction shaft, an epicyclic gear train including a driving gear attached to said driving shaft, a driven gear attached to said intermediate drive shaft, a planet carrier attached to said intermediate reaction shaft, and a plurality of planet gears engaging said driving and driven gears, said planet gears being rotatable with respect to said planet carrier, a one-way brake for releasably connecting said planet carrier to said transmission case, a hydraulic device comprising a pump wheel attached to said intermediate drive shaft, a turbine wheel attached to said driven shaft, and a reaction wheel attached to said intermediate reaction shaft, and an automatic one-way clutch for locking said intermediate reaction shaft to said driven shaft when said reaction wheel tends to overrun said turbine wheel.

5. In a power transmission device, the combination of a transmission case, a driving shaft, a driven shaft, an intermediate drive shaft, an intermediate reaction shaft, an epicyclic gear train including a driving gear attached to said driving shaft, a driven gear attached to said intermediate drive shaft, a planet carrier attached to said intermediate reaction shaft, and a plurality of planet gears engaging said driving and driven gears, said planet gears being rotatable with respect to said planet carrier, a one-way brake for releasably connecting said planet carrier to said transmission case, a hydraulic device comprising a pump wheel attached to said intermediate drive shaft, a turbine wheel attached to said driven shaft, and a reaction wheel attached to said intermediate reaction shaft, an automatic one-way clutch for locking said intermediate reaction shaft to said driven shaft when said reaction wheel tends to overrun said turbine wheel, and an automatic one-way clutch for locking said intermediate reaction shaft to said intermediate drive shaft when said reaction wheel tends to overrun said pump wheel.

EMIL F. NORELIUS.

REFERENCES CITED

The following references are of record in the file of this patent:

UNITED STATES PATENTS

| Number | Name | Date |
| --- | --- | --- |
| 2,196,585 | Giette | Apr. 9, 1940 |
| 2,232,101 | DeTurk | Feb. 18, 1941 |
| 2,308,547 | Schneider | Jan. 19, 1943 |
| 2,365,879 | Jandasek | Dec. 26, 1944 |